United States Patent
Cha et al.

(10) Patent No.: US 9,535,197 B2
(45) Date of Patent: Jan. 3, 2017

(54) COLOR FILTER ARRAY, IMAGE SENSOR INCLUDING THE SAME, AND INFRARED DATA ACQUISITION METHOD USING THE SAME

(71) Applicant: SK hynix Inc., Gyeonggi-do (KR)

(72) Inventors: Su-Ram Cha, Gyeonggi-do (KR); Jong-Suk Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 51 days.

(21) Appl. No.: 14/660,718

(22) Filed: Mar. 17, 2015

(65) Prior Publication Data
US 2016/0154151 A1    Jun. 2, 2016

(30) Foreign Application Priority Data
Dec. 1, 2014  (KR) .................. 10-2014-0169444

(51) Int. Cl.
*H04N 5/225* (2006.01)
*G02B 5/20* (2006.01)
*H04N 9/04* (2006.01)

(52) U.S. Cl.
CPC ............ *G02B 5/201* (2013.01); *H04N 5/2253* (2013.01); *H04N 5/2254* (2013.01); *H04N 9/04* (2013.01)

(58) Field of Classification Search
CPC .................................................... G02B 5/201
See application file for complete search history.

(56) References Cited

U.S. PATENT DOCUMENTS

| | | | |
|---|---|---|---|
| 8,134,191 B2 | 3/2012 | Yamaguchi et al. | |
| 9,338,350 B2* | 5/2016 | Borthakur | H04N 5/23232 |
| 2008/0079748 A1 | 4/2008 | Phan | |
| 2008/0283729 A1* | 11/2008 | Hosaka | H04N 5/332 250/208.1 |
| 2010/0265316 A1* | 10/2010 | Sali | H04N 13/0037 348/46 |
| 2012/0140099 A1* | 6/2012 | Kim | H04N 9/045 348/279 |
| 2012/0257821 A1 | 10/2012 | Saito et al. | |
| 2012/0268566 A1 | 10/2012 | Kim et al. | |
| 2014/0118493 A1* | 5/2014 | Sali | H04N 13/0037 348/43 |
| 2014/0153823 A1* | 6/2014 | Lee | G06T 3/4015 382/167 |
| 2015/0002707 A1* | 1/2015 | Wu | H01L 27/14621 348/279 |

* cited by examiner

*Primary Examiner* — Gary C Vieaux
(74) *Attorney, Agent, or Firm* — IP & T Group LLP

(57) ABSTRACT

A color filter array includes first pixels, second pixels, third pixels, and fourth pixels. The first pixels transmit light with visible and infrared (IR) wavelengths. The second pixels transmit light with the visible wavelengths and surround each of the first pixels. The third pixels transmit light with a first range of wavelengths among the visible wavelengths. The fourth pixels transmit light with a second range of wavelengths among the visible wavelengths.

10 Claims, 3 Drawing Sheets

COLOR FILTER ARRAY, IMAGE SENSOR INCLUDING THE SAME, AND INFRARED DATA ACQUISITION METHOD USING THE SAME

CROSS-REFERENCE TO RELATED APPLICATION

The present document claims priority of Korean Patent Application No. 10-2014-0169444, entitled "COLOR FILTER ARRAY, IMAGE SENSOR HAVING THE SAME AND INFRARED DATA ACQUISITION METHOD USING THE SAME" and filed on Dec. 1, 2014, which is incorporated herein by reference in its entirety.

BACKGROUND

The present inventive concept relates to a semiconductor device manufacturing technology and, more particularly, to a color filter array, an image sensor including the same, and a method of acquiring infrared (IR) data using the same.

A three-dimensional (3D) image sensor that provides depth data as well as image data is being researched and developed. A color filter array (CFA) used in the 3D image sensor may include a color pixel for acquiring color data of an object and an infrared (IR) pixel for acquiring depth data of the object. A method for acquiring high quality color and IR data from the color filter array having both a color pixel and an IR pixel is being researched and developed.

SUMMARY

Various embodiments are directed to a color filter array capable of acquiring high quality color and IR data, an image sensor including the same, and a method of acquiring infrared (IR) data using the same.

According to the embodiment, a color filter array may include: a plurality of first pixels suitable for transmitting light with visible and infrared (IR) wavelengths; a plurality of second pixels suitable for transmitting light with the visible wavelengths, and disposed in patterns that surround each of the plurality of first pixels; a plurality of third pixels suitable for transmitting light with a first range of wavelengths among the visible wavelengths; and a plurality of fourth pixels suitable for transmitting light with a second range of wavelengths among the visible wavelengths.

The plurality of second pixels may be disposed in a checkerboard pattern, and wherein each of the plurality of first pixels may be disposed in a different row and a column from each of the plurality of second pixels. The plurality of first pixels and the plurality of second pixels may be alternately disposed in a diagonal direction. A of the plurality of first pixels and the plurality of second pixels may be in a range of 40% to 60% of a total number of pixels. The number of the plurality of first pixels may be equal to or smaller than the number of the plurality of second pixels. The plurality of third pixels and the plurality of fourth pixels may be randomly disposed in remaining spaces excluding spaces occupied by the plurality of first pixels and the plurality of second pixels. The number of the plurality of third pixels may be equal to the number of the plurality of fourth pixels. Each of the plurality of third pixels and the plurality of fourth pixels may include any one selected from the group consisting of a red filter, a green filter, a blue filter, a cyan filter, a yellow filter and a magenta filter. The plurality of third pixels may include filters that have a lowest correlation of spectral sensitivity with respect to the plurality of fourth pixels. The first pixels, the second pixels, the third pixels, and the fourth pixels may include transparent pixels, white pixels, blue pixels, and red pixels, respectively.

According to the embodiment, a color filter array may include: a plurality of sub arrays which have a 3×3 matrix structure, wherein each of the sub arrays may includes: a first pixel suitable for transmitting light with visible and infrared (IR) wavelengths, and disposed at a center of the sub array; a plurality of second pixels suitable for transmitting light with the visible wavelengths, and respectively disposed at corners of the sub array; a plurality of third pixels suitable for transmitting light with a first range of wavelengths among the visible wavelengths; and a plurality of fourth pixels suitable for transmitting light with a second range of wavelengths among the visible wavelengths.

A ratio of the first pixel, the second pixels, the third pixels and the fourth pixels in the sub array may be 1:4:2:2. The plurality of sub arrays may partly share pixels other than the first pixel. Each of the plurality of third pixels and the plurality of fourth pixels may include any one selected from the group consisting of a red filter, a green filter, a blue filter, a cyan filter, a yellow filter and a magenta filter. The plurality of third pixels may include filters which have a lowest correlation of spectral sensitivity with respect to the plurality of fourth pixels. The plurality of third pixels may be disposed on the top and bottom of the first pixel, and the plurality of fourth pixels may be disposed at the sides of the first pixel T.

According to the embodiment, an image sensor may include: a color filter array including: a plurality of first pixels suitable for transmitting light with visible and infrared (IR) wavelengths; a plurality of second pixels suitable for transmitting light with the visible wavelengths and disposed in patterns that surround each of the plurality of first pixels; a plurality of third pixels suitable for transmitting light with a first range of wavelengths among the visible wavelengths; and a plurality of fourth pixels suitable for transmitting light with a second range of wavelengths among the visible wavelengths; and a photoelectric conversion layer formed under or over the color filter array.

According to the embodiment, a method of operating an image sensor may including a plurality of color filter arrays that each have a 3×3 matrix structure and include a first pixel suitable for transmitting light with visible and infrared (IR) wavelengths and disposed at a center of the color filter array and a plurality of second pixels suitable for transmitting light with the visible wavelengths and respectively disposed at corners of the color filter array, the method may include: generating an interpolation signal corresponding to a location of the first pixel, by using the plurality of second pixels which surround the first pixel; and generating IR data from a difference between a pixel signal outputted from the first pixel and the interpolation signal.

The method may further include: calculating a weight based on a brightness difference between each of pixel signals of the first and second pixels and an average value of the pixel signals; and generating color data by comparing pixel signals of third and fourth pixels and reflecting the weight, wherein the third and fourth pixels transmit light with first and second ranges of wavelengths, respectively, among the visible wavelengths. The first pixel, the second pixels, the third pixels, and the fourth pixels may include transparent pixel, white pixels, blue pixels, and red pixels, respectively.

According to the embodiments, high quality IR data may be acquired as second pixels are disposed to surround a first pixel. In addition, high quality color data may be acquired as third pixels and fourth pixels have a low correlation of spectral sensitivity.

DETAILED DESCRIPTION OF THE EMBODIMENTS

Hereinafter, preferred exemplary embodiments of the present inventive concept will be described with reference to the accompanying drawings to describe the present inventive concept in detail to the extent that a person skilled in the art to which the invention pertains can easily enforce the technical concept of the present invention. The drawings are not necessarily to scale and, in some instances, proportions may have been exaggerated in order to clearly illustrate features of the embodiments. When a multilayer structure having more than two layers is disclosed, relative positions and orders of the layers may reflect particular exemplary embodiments. However, the present inventive concept should not be construed as being limited to the exemplary embodiments thereof and the relative positions and orders of layers may vary. Also, drawings and detailed descriptions of the multi-layer structure may not include all the layers in a particular multi-layer structure (for example, at least one layer may exist between the described layers). For example, when a first layer is disposed on a second layer or a substrate in the detailed description specification and drawings, the first layer may be disposed directly on the second layer or the substrate, or at least one layer may be disposed between the first layer and the second layer or the substrate.

Exemplary embodiments of the present inventive concept which will be described below provide a color filter array for acquiring high quality color data and IR data, an image sensor using the color filter array, and a method for acquiring IR data using the image sensor. In the exemplary embodiments of the present inventive concept, in order to prevent resolution from deteriorating, IR pixels are not separately disposed in a red-green-blue (RGB) Bayer pattern, and instead, any one white pixel of a white-red-white-blue (WRWB) Bayer pattern transmits visible and IR light and the remaining white pixels of the WRWB pattern transmit only visible light. The IR data may be acquired by using the difference of light transmitted from the two white pixels. In the exemplary embodiments of the present inventive concept, when extracting IR data, simply the difference of the light transmitted from the two white pixels is not calculated, but an interpolation signal corresponding to the white pixel including IR data is generated by using the spatial correlation between the white pixel including IR data and surrounding white pixels not having IR data, whereby it is possible to improve the accuracy of the IR data.

Figure 1:
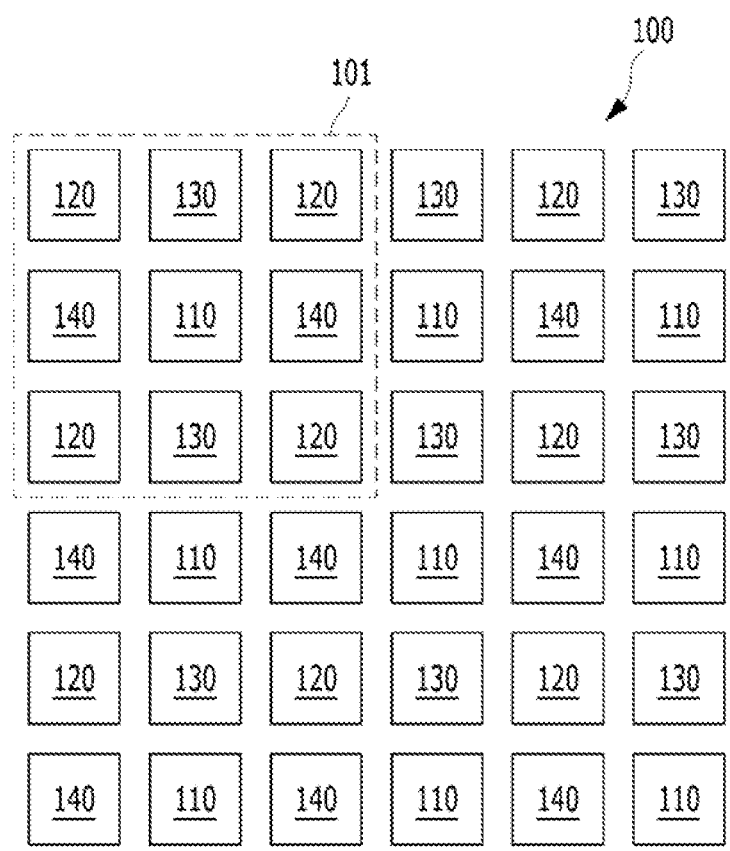
FIG. 1 is a diagram illustrating a color filter array according to an exemplary embodiment of the present inventive concept.

FIG. 1 a diagram illustrating a color filter array according to an exemplary embodiment of the present inventive concept.

Referring to FIG. 1, a color filter array 100 according to an exemplary embodiment of the present inventive concept includes a plurality of first pixels 110, which transmit light with visible and IR wavelengths, a plurality of second pixels 120 which transmit light with visible wavelengths, a plurality of third pixels 130 which transmit light with a first range of wavelengths among the visible wavelengths, and a plurality of fourth pixels 140 which transmit light with a second range of wavelengths among the visible wavelengths.

The plurality of first pixels 110 are to acquire IR data, and may be transparent pixels which transmit visible and IR light. The plurality of second pixels 120 are to acquire IR data and color data corresponding to a third range of wavelengths among the visible wavelengths, and may be white pixels. The plurality of third pixels 130 and the plurality of fourth pixels 140 are to acquire color data.

In the color filter array 100 according to an exemplary embodiment of the present inventive concept, the plurality of second pixels 120 may be disposed in a checkerboard pattern, and may have patterns that surround the plurality of first pixels 110. In detail, the plurality of first pixels 110 may be disposed in different rows and columns from the plurality of second pixels 120. That is to say, the plurality of second pixels 120 may be disposed in corners of the plurality of first pixels 110. The plurality of first pixels 110 and the plurality of second pixels 120 may be disposed alternately in diagonal directions.

The sum of the plurality of first pixels 110 and the plurality of second pixels 120 may be about 50% of the total number of pixels. In detail, the sum of the plurality of first pixels 110 and the plurality of second pixels 120 may be in the range of 40% to 60% of the total number of pixels. When the sum of the plurality of first pixels 110 and the plurality of second pixels 120 is smaller than 40% of the total number of pixels, it may be difficult to acquire IR data. When the sum is greater than 60% of the total number of pixels, it may be difficult to acquire color data. The number of the plurality of first pixels 110 may be equal to or smaller than the number of the plurality of second pixels 120. If the number of the plurality of first pixels 110 is greater than the number of the plurality of second pixels 120, it may be difficult to acquire color data through post processing, for example, interpolation.

The plurality of third pixels 130 and the plurality of fourth pixels 130 may be randomly disposed in remaining spaces excluding spaces in which the plurality of first pixels 110 and the plurality of second pixels 120 are disposed. The number of the plurality of third pixels 130 and the plurality of fourth pixels 140 may be equal to each other in the color filter array 100. Each of the plurality of third pixels 130 and the plurality of fourth pixels 140 may include any one selected from the group consisting of a red filter, a green filter, a blue filter, a cyan filter, a yellow filter and a magenta filter. In the above-described filter group, the plurality of third pixels 130 may include filters which have the lowest correlation of spectral sensitivity with respect to the plurality of fourth pixels 140. A low correlation of spectral sensitivity between two filters may mean that the range between wavelengths corresponding to the respective filters is wide. For example, when the plurality of third pixels 130 include blue filters, the plurality of fourth pixels 140 may include red filters. This is to acquire high quality color data through post processing, for example, interpolation.

The color filter array 100 according to an exemplary embodiment of the present inventive concept may include a plurality of sub arrays 101 which have a 3×3 matrix structure. The plurality of sub arrays 101 may be randomly disposed in the color filter array 100. Each sub array 101 may include a first pixel 110 which is disposed at a center thereof, a plurality of second pixels 120 which are respectively disposed at corners thereof, and a plurality of third pixels 130 and a plurality of fourth pixels 140 which are randomly disposed in the remaining spaces. A ratio of the first pixel 110, the second pixels 120, the third pixels 130 and the fourth pixels 140 in each sub array 101 may be 1:4:2:2. The plurality of sub arrays 101 may partly share the second pixels 120 to the fourth pixels 140 excluding the first pixel 110. The sub array 101 may serve as the basic unit of post processing for acquiring color data and IR data. This will be described later in detail through a method of acquiring color data and IR data.

The color filter array 100 according to the exemplary embodiment of the present inventive concept may acquire high quality IR data as the plurality of second pixels 120 are disposed in a pattern that surrounds the plurality of first pixels 110. In addition, since the plurality of third pixels 130 and the plurality of fourth pixels 140 which have a low correlation of spectral sensitivity are used, high quality color data may be acquired.

Figure 2:
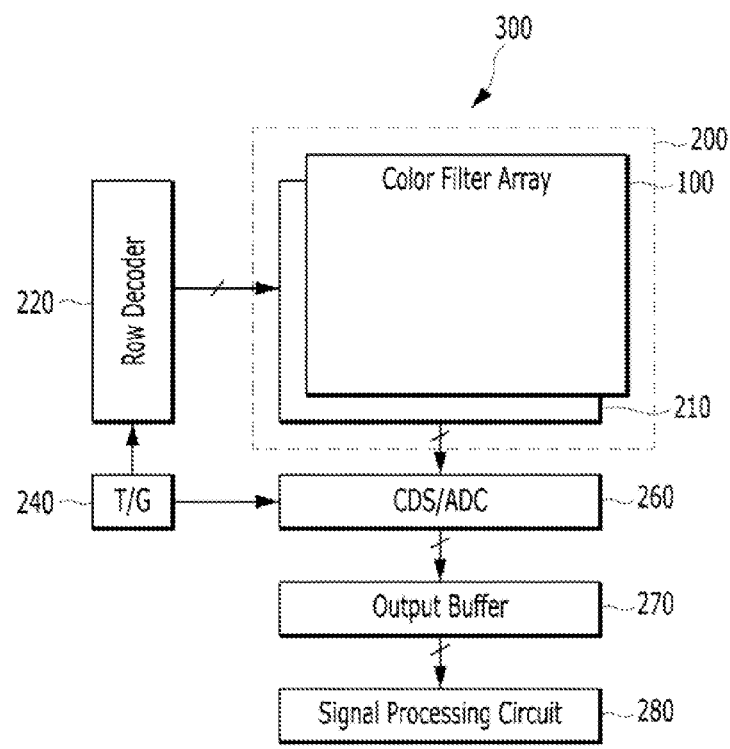
FIG. 2 is a block diagram schematically illustrating an image sensor including a color filter array according to an exemplary embodiment of the present inventive concept.
Figure 3:
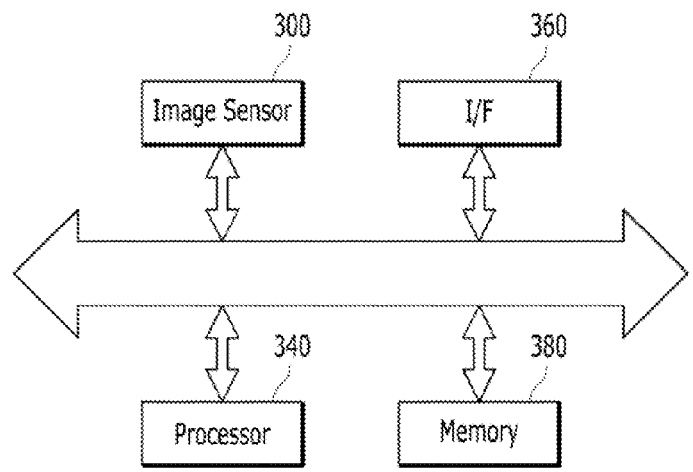
FIG. 3 is a block diagram schematically illustrating an image processing device including the image sensor of FIG. 2.

FIG. 2 is a block diagram schematically illustrating an image sensor including a color filter array according to an exemplary embodiment of the present inventive concept, and FIG. 3 is a block diagram schematically illustrating an image processing device including the image sensor shown in FIG. 2 according to an exemplary embodiment of the present inventive concept.

Referring to FIGS. 2 and 3, an image sensor 300 may include a pixel array 200, a row decoder 220, a timing generator 240, and a CDS/ADC circuit 260.

The pixel array 200 may include the color filter array 100 according to the exemplary embodiment of the present inventive concept, and a photoelectric conversion layer 210 which is formed under the color filter array 100 and includes a plurality of photoelectric conversion elements respectively corresponding to the filters of the color filter array 100. The pixel array 200 may include a plurality of pixels for outputting the color data and the IR data included in incident light. Each of the plurality of pixels may output a pixel signal corresponding incident light that passes through each filter of the color filter array 100. The photoelectric conversion elements may include photodiodes.

The row decoder 220 may select one of a plurality of roods in response to an address and control signals outputted from the timing generator 240. The CDS/ADC circuit 260 may perform correlated double sampling (CDS) for the signals outputted from the pixel array 200 in response to the controls signals outputted from the timing generator 240, perform analog-to-digital (A/D) conversion for the signals having undergone the CDS, and output digital signals. The respective digital signals may correspond to the intensities of incident light having passed through corresponding filters of the co or filter array 100.

In addition, according to an exemplary embodiment of the present inventive concept, the image sensor 300 may further include an output buffer 270 and a signal processing circuit 280. The signal processing circuit 280 may be realized as a part of the image processing system illustrated in FIG. 3. The signal processing circuit 280 may generate image data and depth data based on a plurality of pixel signals or a plurality of digital signals. The output buffer 270 may be realized by a plurality of buffers which store the digital signals outputted from the CDS/ADC circuit 260. The output buffer 270 may output the digital signals to the signal processing circuit 280. According to an embodiment, the output buffer 270 may be omitted.

An image processing system according to an exemplary embodiment of the present inventive concept may include a digital camera, a mobile phone embedded with a digital camera, or electronic devices each including a digital camera. The image processing system may process two-dimensional image data or three-dimensional image data. The image processing system may include the image sensor 300 according to the exemplary embodiment of the present inventive concept and a processor 340 for controlling the operation of the image sensor 300.

The image processing system according to an exemplary embodiment of the present inventive concept may further include an interface 360 and a memory 380. The interface 360 may be an image display device or an input/output device. The memory 380 may store the data provided from the image sensor 300 and the data processed using the data provided from the image sensor 300, under the control of the processor 340.

Hereinafter a method of sensing color data and IR data from the color filter array 100 and the image sensor 300 including the color filter array 100 will be described in detail with reference to FIGS. 1 to 3. For a simple explanation, it is described as an example that a first pixel, a second pixel, a third pixel and a fourth pixel are a transparent pixel T, a white pixel W, a blue pixel B and a red pixel R, respectively. In addition, it is described as an example that, in a sub array having a 3×3 matrix structure, a single transparent pixel T is disposed at the center of the sub array and four white pixels W are respectively disposed at corners of the sub array. Further, it is described as an example that two blue pixels B are disposed between white pixels W arrayed in a row direction and two red pixels R are disposed at both sides of the transparent pixel T in the row direction.

Figure 4:
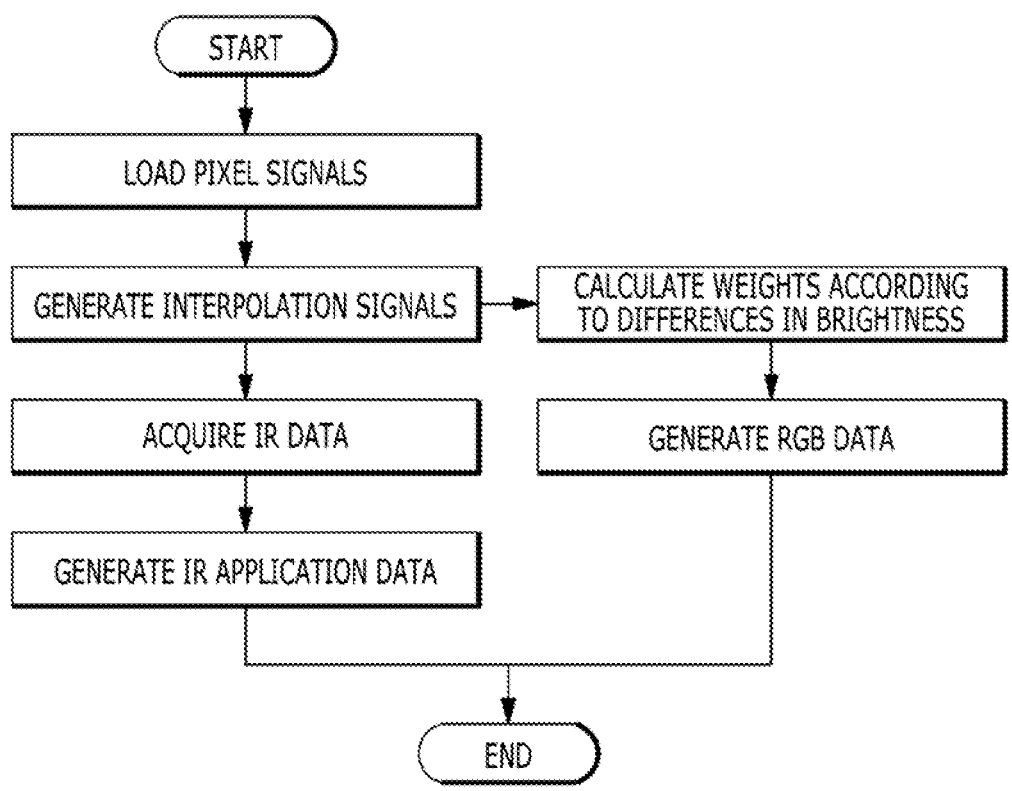
FIG. 4 is a flow chart illustrating a method of acquiring color data and IR data according to an exemplary embodiment of the present inventive concept.

FIG. 4 is a flow chart explaining a method of acquiring color data and IR data according to an exemplary embodiment of the present inventive concept.

First, a method of acquiring IR data will be described.

Pixel signals are loaded on a signal processing circuit (e.g., see the reference numeral 280 of FIG. 2) or a processor (e.g., see the reference numeral 340 of FIG. 3). The pixel signals may be loaded on the basis of a sub array. In other words, the pixel signals outputted from at least one sub array are loaded on the signal processing circuit or the processor.

Next, the transparent pixel T is interpolated into a white pixel W using the pixel signals of the white pixels W which surround the transparent pixel T. Namely, an interpolation signal corresponding to the location of the transparent pixel T is generated by considering the edge direction of the white pixels W which surround the transparent pixel T.

Then, the IR data is acquired by calculating the difference between the pixel signal outputted from the transparent pixel T and the interpolation signal corresponding to the location of the transparent pixel T. As the interpolation signal is generated from the plurality of white pixels W which surrounds the transparent pixel T, the accuracy of IR data may be increased.

In this way, IR data corresponding to each sub array may be acquired.

The IR data corresponding to respective sub arrays are collected and mapped, and IR application data, for example, depth data or focus data, are generated by comparing the IR data of adjacent sub arrays. The depth data may be used in realizing a 3-D image, and the focus data may be used in auto-focusing or image blur processing.

Hereinafter, a method of acquiring color data rill be described.

After pixel signals outputted from at least one sub array are loaded on a signal processing circuit or a processor, an interpolation signal corresponding to the location of the transparent pixel T generated by considering the edge direction of the white pixels W which surround the transparent pixel T.

Based on the average value of pixel signals corresponding to five white pixels W which include the interpolated transparent pixel T, a weight is calculated according to the brightness difference of each white pixel W.

In addition, pixel signals of a blue pixel B and a red pixel R, which are adjacent to each white pixel W, are compared with each other, and each white pixel W is interpolated to a green pixel G by reflecting the weight according to the brightness difference of each white pixel W.

Thus, the RGB color data may be acquired. Since the blue pixel B and the red pixel R have a low correlation of spectral sensitivity, the white pixel W may be effectively interpolated to the green pixel G, and noise among color data may be significantly reduced.

While the present inventive concept has been described with reference to exemplary embodiments thereof, the present inventive concept should not be construed as limited by the embodiments described herein. It will be understood by those skilled in the art that many modifications in form and detail may be made without departing from the spirit and scope of the present inventive concept.

What is claimed is:

1. An image sensor comprising:
   a color filter array including a plurality of sub arrays which have a 3×3 matrix structure;
   wherein each of the sub arrays comprises:
     a first pixels configured to transmit light with visible and infrared (IR) wavelengths;
     a plurality of second pixels configured to transmit light with the visible wavelengths and disposed in patterns that surround the first pixel to respectively be disposed at corners of the sub array;
     a plurality of third pixels configured to transmit light with a first range of wavelengths among the visible wavelengths; and
     a plurality of fourth pixels configured to transmit light with a second range of wavelengths among the visible wavelengths;
   a photoelectric conversion layer formed under or over the color filter array; and
   a signal processing circuit coupled to the photoelectric conversion layer and configured to generate an interpolation signal for the first pixel contained in each sub array by using the plurality of second pixels surrounding the first pixels, generate IR data from a difference between each of pixel signals outputted from the first pixel and the interpolation signal, calculate a weight based on a brightness difference between each of pixel signals of the first and second pixels and an average value of the pixel signals, and generate color data by comparing pixel signals of the third and fourth pixels and reflecting the weight.

2. The image sensor of claim 1, wherein the plurality of second pixels are disposed in a checkerboard pattern, and
   wherein the first pixel is disposed in a different row and a column from each of the plurality of second pixels.

3. The image sensor of claim 1, wherein the first pixel and the plurality of second pixels are alternately disposed in a diagonal direction.

4. The image sensor of claim 1, wherein the plurality of third pixels and the plurality of fourth pixels are randomly disposed in remaining spaces excluding spaces occupied by the first pixel and the plurality of second pixels.

5. The image sensor of claim 1, wherein the number of the plurality of third pixels are equal to the number of the plurality of fourth pixels.

6. The image sensor of claim 1, wherein each of the plurality of third pixels and the plurality of fourth pixels comprise any one selected from the group consisting of a red filter, a green filter, a blue filter, a cyan filter, a yellow filter and a magenta filter.

7. The image sensor of claim 6, wherein the plurality of third pixels comprise filters that have a lowest correlation of spectral sensitivity with respect to the plurality of fourth pixels.

8. The image sensor of claim 1, wherein the first pixel, the second pixels, the third pixels, and the fourth pixels include a transparent pixel, white pixels, blue pixels, and red pixels, respectively.

9. A method of operating an image sensor including a plurality of color filter arrays that each have a 3×3 matrix structure and include a first pixel suitable for transmitting light with visible and infrared (IR) wavelengths and disposed at a center of the color filter array and a plurality of second pixels suitable for transmitting light with the visible wavelengths and respectively disposed at corners of the color filter array, the method comprising:
   generating an interpolation signal corresponding to a location of the first pixel, by using the plurality of second pixels which surround the first pixel;
   generating IR data from a difference between a pixel signal outputted from the first pixel and the interpolation signal;
   calculating a weight based on a brightness difference between each of pixel signals of the first and second pixels and an average value of the pixel signals; and
   generating color data by comparing pixel signals of third and fourth pixels and reflecting the weight,
   wherein the third and fourth pixels transmit light with first and second ranges of wavelengths, respectively, among the visible wavelengths.

10. The method of claim 9, wherein the first pixel, the second pixels, the third pixels, and the fourth pixels include transparent pixel, white pixels, blue pixels, and red pixels, respectively.

* * * * *